(12) United States Patent
Jung

(10) Patent No.: US 7,302,987 B2
(45) Date of Patent: Dec. 4, 2007

(54) PROTECTIVE COVERING FOR THE WORKING AREA OF A MACHINE TOOL

(75) Inventor: Robert Jung, Pfronte-Ried (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 232 days.

(21) Appl. No.: 10/536,290

(22) PCT Filed: Feb. 26, 2004

(86) PCT No.: PCT/EP2004/001922

§ 371 (c)(1),
(2), (4) Date: May 25, 2005

(87) PCT Pub. No.: WO2004/076121

PCT Pub. Date: Sep. 10, 2004

(65) Prior Publication Data

US 2006/0024464 A1 Feb. 2, 2006

(30) Foreign Application Priority Data

Feb. 26, 2003 (DE) ................................ 203 03 109

(51) Int. Cl.
*B23Q 11/08* (2006.01)
(52) U.S. Cl. ......................................... 160/222; 428/57
(58) Field of Classification Search .................. 428/57; 160/222; 409/134; 74/612
See application file for complete search history.

(56) References Cited

U.S. PATENT DOCUMENTS 3,366,012 A 1/1968 Richter
5,560,415 A * 10/1996 Geissler ...................... 160/220

FOREIGN PATENT DOCUMENTS

| DE | 954 304 | 12/1956 |
| DE | 0 407 599 A1 | 1/1991 |
| DE | 202 00 700 U1 | 6/2002 |
| DE | 101 23 580 A1 | 11/2002 |
| EP | 0 673 712 A1 | 9/1995 |

OTHER PUBLICATIONS

Derwent abstract of DE 202 00 700 U1, May 2, 2002.*

* cited by examiner

*Primary Examiner*—Alexander S. Thomas
(74) *Attorney, Agent, or Firm*—The Maxham Firm

(57) ABSTRACT

A protective cover for the work area of a machine tool having a plurality of frame-like segments disposed so as to be limitedly shiftable within each other and respectively provided with a sealing strip on at least one edge. A plurality of connecting elements formed as slidable lattice grates connect the frame-like segments, the respective link pins of the slidable lattice grates being fixed to a respective rear segment of a segment. For simplified assembly and removal of the protective cover the slidable lattice grates are detachably fixed to the frame-like segments.

9 Claims, 3 Drawing Sheets

PROTECTIVE COVERING FOR THE WORKING AREA OF A MACHINE TOOL

BACKGROUND OF THE INVENTION

1. Field of the Invention

The invention relates generally to a protective cover for the work area of a machine tool comprising a plurality of frame-like segments disposed so as to be limitedly shiftable within each other and respectively provided with a sealing strip on at least one edge and connecting elements formed as slidable lattice grates connecting the frame-like segments, the respective link pins of the slidable lattice grates being fixed to a rear segment of a respective segment.

2. Background

Protective covers of this type generally comprise a plurality of frames arranged so as to be relatively shiftable within each other, the outermost one of the frames being fixedly connected to a component of the machine tool and the innermost frame being attached to a machine slide or a spindle housing movable in at least one coordinate axis. An example of such a protective cover is shown in EP 0 673 712. The frames are formed of a resistant sheet metal and comprise a broad front bridge or segment which forms the effective part of the protective cover and is provided with a sealing strip at its edge section, a transverse bridge and a shorter rear segment extending parallel to the front segment. The broad front segments of the adjacent segments overlap each other so that all of the bridges together form a virtually continuous protective wall. The inner frames or frame-like segments are shiftably disposed in the respective outer frames having the same shape and greater dimensions and connected to each other by connecting elements formed as slidable lattice grates, the respective link pins of the slidable lattice grates being permanently fixed to a rear segment of a respective segment. In practice, work-related problems have occurred when maintenance and repair work had to be carried out and the protective cover had to be totally or partially removed for this purpose. In such cases not only the frame-like segments but also the slidable lattice grates, including the respective guiding and attachment elements of the protective cover and therefore the whole protective cover, had to be removed, which entailed a significant amount of work.

SUMMARY OF THE INVENTION

According to the invention the desired reduction of the mounting operations on a machine tool is accomplished by detachably fixing slidable lattice grates to the frame-like segments. By releasing the connecting means between the respective slidable lattice grate or its link pins and the associated frame-like segment, one or more of the frame-like segments may be removed while the slidable lattice grates, including their attachment and guiding elements, remain on the machine.

An embodiment of the releasable attachment means which is, on the one hand, stable, and, on the other hand, easily movable, is characterised in that the link pins attached to the narrower rear segments of the frame-like segments are surrounded by a flange sleeve on which the two crossed arms of the slidable lattice grate are non-detachably supported, the flange sleeve being detachably connected to the associated link pin. Efficiently the flange sleeve contacts a distance shim fixedly connected to the respective segment with its flange and is detachably connected to the respective link pin through a disk as well as by a screw. The largely dimensioned support of the flange sleeve on the distance shim by means of its flange ensures a tilting-free positioning of the flange sleeve, and the end side screw connection provides a safe, bilateral fixation of the two arms of the slidable lattice grate which are pivotable with respect to each other.

A particularly efficient further development of the invention is characterised in that the frame-like segments are, at least partly, particularly in their lower segments, held in tight mutual contact by a resilient pressure. With the resilient pressure acting on the frame-like segments a tight contact of their wide front side segments is achieved so that gaps between the two front bridges or segments of adjacent frame-like segments, through which flushing liquid or chips might enter the space behind the protective cover, are avoided. The resilient pressure forces acting on the individual segments should be finely adjustable so that the ready movability of the frames is not affected during their relative movements. The elastic abutment should, however, be sufficiently large to ensure a sufficiently tight contact of the edge side sealing strips of one segment to the wider front segments of the adjacent segment so that a wiper effect is accomplished during the shifting movements of the frame-like segments. An effective resilient pressure acting on two frame-like segments may be achieved in a technically simple manner by rendering at least some link pins of the slidable lattice grates spring-biased and having them disposed axially movable within their flange sleeves. To maintain the spring bias a pressure spring acting on the link pin may be provided in a jack surrounding the end portion of a link pin.

BRIEF DESCRIPTION OF THE DRAWING

The objects, features, and advantages of the invention will be more clearly perceived from the following detailed description, when read in conjunction with the accompanying drawing, in which.

DETAILED DESCRIPTION OF THE PREFERRED EMBODIMENTS

Figure 1:
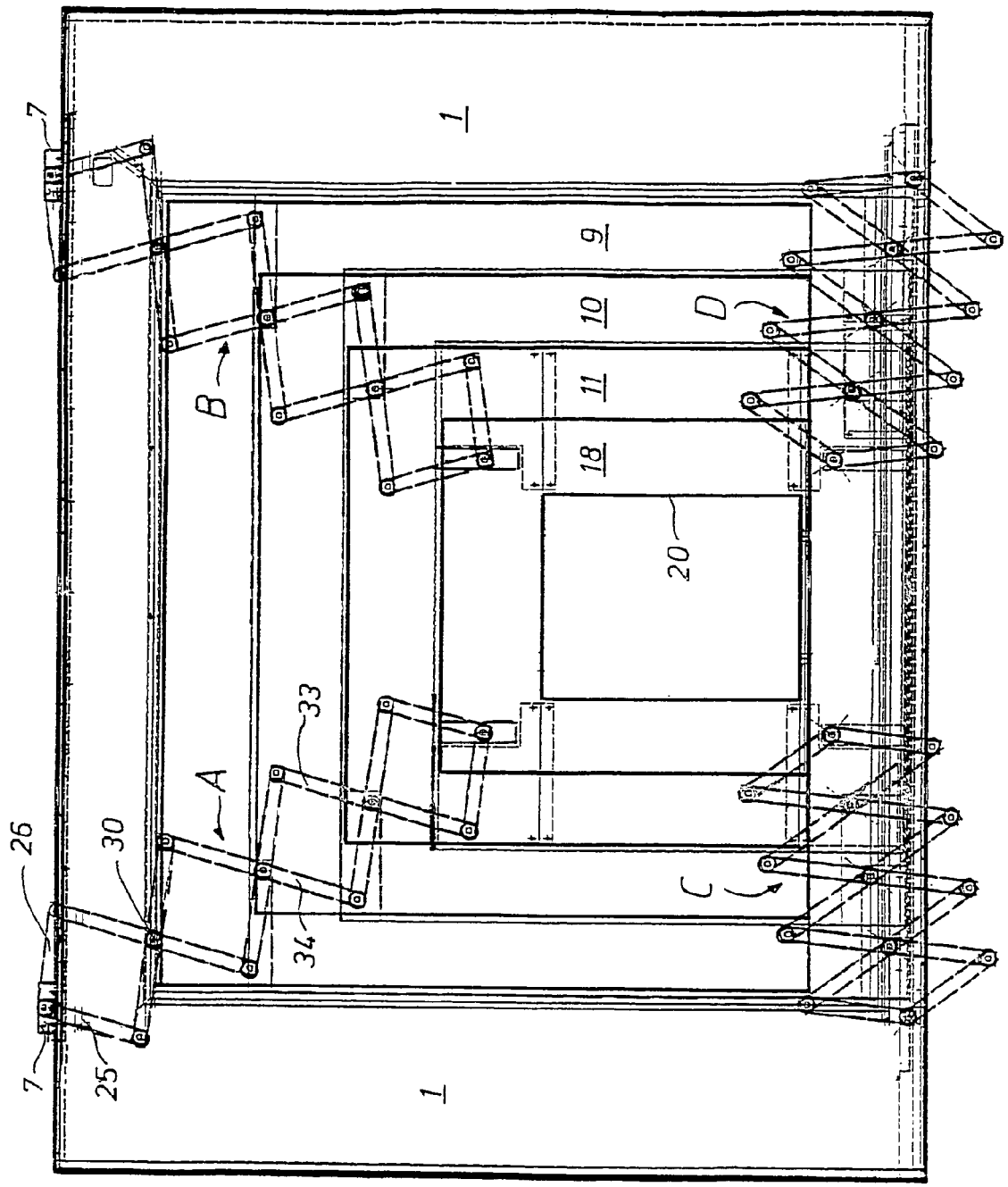
FIG. 1 is a schematic front view of an embodiment of the protective cover of the invention for the work area of a machine tool.
Figure 2:
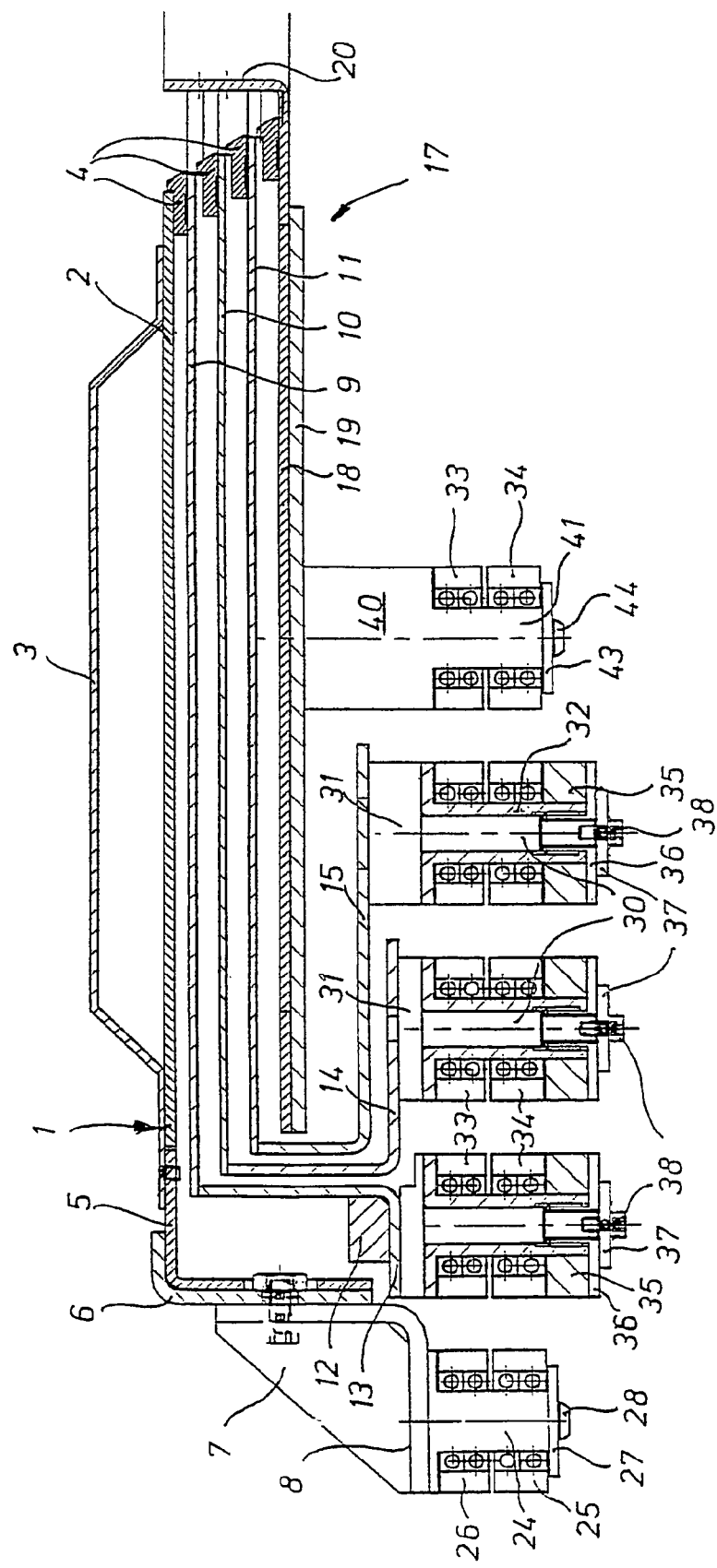
FIG. 2 is a cross sectional view of a plurality of the frame-like segments of the protective cover shown in FIG. 1 fully inserted into each other, together with their connection means.

With reference to the drawing, and more particularly to FIGS. 1 and 2, a protective cover in accordance with the invention is shown which comprises rectangular, rigid outer frame 1 having a broad front segment 2 covered by profiled sheet metal 3. The front segment rests on sealing strip 4 at its edge. Angle section 5 is connected to broad plane segment 2, the angle section being fixed to the vertical bridge of angular beam 7 by means of angle profile 6, using screws 8, for example. In the inner space covered by outer frame 1 are provided three respectively frame-like segments 9, 10, 11, each comprising an upper sheet metal strip, these frame-like segments 9, 10, 11 being slid into each other in the illustrated embodiment. On the right edge (FIG. 2) of each sheet metal strip of segments 9, 10, 11, respective sealing strip 4 is fixed to the upper side. The width of the sheet metal strips of segments 9, 10, 11 is chosen so that sealing strips 4 are overlapping with a slight lateral displacement in the illustrated, fully inserted operating state. As can be seen in FIG. 2, the left edge of the sheet metal strip of the segment 9 is connected to an L-shaped, rigid profile sheet, narrower lower segment 13 of which is bent to the outside and carries reinforcing beam 12 in the angle area. The sheet metal strips of frame-like segments 10, 11 are also fixedly connected to L-shaped, rigid sheet metal profiles on their left edge, horizontal segments 14, 15 of these sheet metal profiles pointing inward. Under frame-like segment 11 a flat frame 17 is provided which comprises a plane metal sheet 18 and a support plate 19 attached to its bottom side. Right-angle bend 20 provided on its right edge, the height of which approximately corresponds to the height of the segment package. Right-angle bend 20 is fixed to a machine part (for example, a spindle head) movable in two coordinate axes.

On the bottom side of horizontal segment 8 of beam 7 is link pin 24 permanently attached to segment 8. Two arms 25, 26 of a slidable lattice grate are pivotably supported on link pin 24. Locating disk 27 is detachably fixed to the end of link pin 24 by means of bolt 28.

On rear horizontal segments 13, 14, 15 of frame-like segments 9, 10, 11 further link pins 30 are permanently attached via spacers 31 of different thicknesses. On each link pin 30 is provided detachable flange sleeve 32. This flange contacts a large area of the respective spacer 31. On each flange sleeve 32 the respectively two arms 33, 34 of one of the four slidable lattice grates A, B, C, D (shown in dashed lines in FIG. 1) are supported in roller bearings shown in FIG. 2. Cheaper plain bearings, or other operative bearings could also be used. On the free end portion of each flange sleeve 32 is spacer ring 35. On spacer ring 35 is annular or ring-shaped disk 36 which is in engagement with the end portion of flange sleeve 32 by means of a collar-shaped extension. This engagement may be by means of a threaded connection. Disk 37 is pressed against the outer surface of disk 36 by suitable means such as stud bolt 38 screwed into the face of the narrow end portion of link pin 30. After the removal of stud bolt 38 and the detachment of pressure disk 37 it is possible to obtain axial release movement between respective link pin 30 and the assembly comprising flange sleeve 32, arms 33, 34 of the slidable lattice grate supported on the flange sleeve, spacer ring 35, and ring-shaped disk 36.

On the support sheet 19 of lowest, plane, frame-like segment 18, support arm fastening 40 is directly and permanently fixed. The two ends of the inner arms 33, 34 of the slidable lattice grate are supported on the narrower pivoting pins 41 of support arm fastening 40. An end side safety disk 43 attached to pivoting pin 41, typically by means of stud bolt 44, prevents an axial displacement of arms 33, 34 on pin 41.

Figure 3:
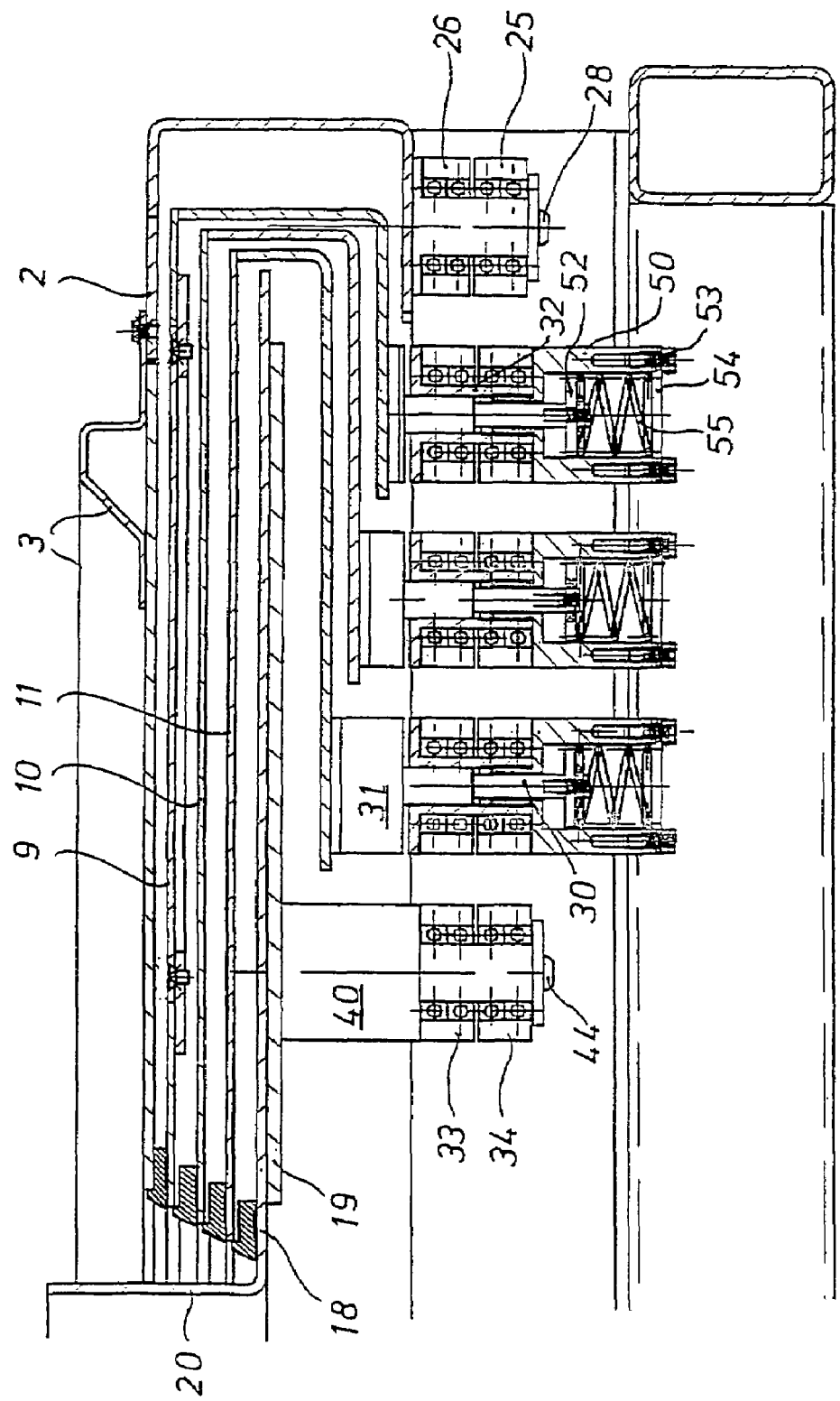
FIG. 3 is a cross sectional view of a plurality of the frame-like segments of the protective cover shown in FIG. 1 fully inserted into each other, together with their spring-biased connection means.

The protective cover shown in a partial cross section in FIG. 3 corresponds to the embodiment according to FIG. 2 to a large extent so that components corresponding to each other are indicated by the same numerals. In this case also the frame-like segments are in their fully inserted state, that is, the spindle head possibly built into right-angle bend 20 of lower, plane segment 18 is in the right end position. The three connecting means between the three frame-like segments 9, 10, 11 and the slidable lattice grates differ from those of the embodiment shown in FIG. 2. The connecting means also comprise link pins 30 on which flange sleeves 32 are supported in roller or plain bearings. Instead of the pressure or spacer ring shown in FIG. 2, bowl-shaped support 50 may be screwed into the inner space of flange sleeve 32 via a collar-shaped extension is used in this FIG. 3 embodiment. The narrower end portion of link pin 30 to which disk 52 is fixed by means of screws protrudes into bowl-shaped support 50. The bowl-shaped support is closed to the outside by termination disk 54, preferably detachably fixed by means of screws. Between termination disk 54 and disk 52, and fixed on link pin 30, is mounted pressure spring 55. This pressure spring is supported by termination disk 54 and exerts an axial force on link pin 30. That force is transmitted to the frame-like segment which is pushed against the adjacent frame-like segment with its sealing strip 4 in this way whereby a sufficiently tight contact is achieved and therefore a leakage and an entry of chips are prevented even during mutual displacement movements of the segments. The pressing forces generated by the various pressure springs 55 are finely adjustable so that, on the one hand, a sufficiently tight contact of the sealing strips 4 is achieved and, on the other hand, the frame-like segments remain readily movable during their shifting movements.

In case of the connecting means shown in FIG. 3, the individual segments may also be separated from the bearings of the arms of the slidable lattice grates in an easy manner to remove the frame-like segments without having to detach the slidable lattice grates. Instead of springs 55 other suitable pressure elements may be used which generate corresponding pressure forces due their resilient deformability.

The invention claimed is:

1. A protective cover for the work area of a machine tool, the cover comprising:
   a plurality of frame segments mutually disposed so as to be limitedly shiftable within each other, each frame segment having a rear segment;
   a sealing strip on at least one edge of each said frame segment;
   connecting elements formed as slidable lattice grates, each having two crossed arms, said lattice grates connecting said frame segments, said slidable lattice grates having respective link pin assemblies, each comprising a link pin, said link pins being fixed to said rear segment of respective ones of said frame segments;
   said slidable lattice grates being detachably attached to said frame segments;
   said link pin in each said link pin assembly being respectively surrounded by a flange sleeve on which said two crossed arms of the respective slidable lattice grates are supported in bearings; and
   each said respective flange sleeve is detachably connected to said respective link pin;
   wherein at least some of said link pins are spring biased and axially shiftable within their said flange sleeves.

2. The protective cover according to claim 1, wherein said respective link pin assemblies farther comprise a spacer disk fixedly connected to said link pin and the respective segment with its flange and is detachably connected to said respective link pin by means of a disk and a screw at its end side, said flange sleeve contacting said spacer disk.

3. The protective cover according to claim 2, wherein at least parts of said frame segments are held in tight contact to each other by a resilient pressure.

4. The protective cover according to claim 3, wherein there are four coupled, diametrically opposed slidable lattice grates.

5. The protective cover according to claim 2, wherein there are four coupled, diametrically opposed slidable lattice grates.

6. The protective cover according to claim 1, wherein at least parts of said frame segments are held in tight contact to each other by a resilient pressure.

7. The protective cover according to claim 6, wherein there are four coupled, diametrically opposed slidable lattice grates.

8. The protective cover according to claim 1, wherein said spring bias is provided by a pressure spring acting on said link pin, said pressure spring being contained in a bowl-shaped sleeve surrounding an end portion of said link pin.

9. The protective cover according to claim 1, wherein there are four coupled, diametrically opposed slidable lattice grates.

* * * * *